United States Patent
Chavan et al.

(10) Patent No.: US 11,569,645 B2
(45) Date of Patent: Jan. 31, 2023

(54) WHILE-IN-USE COVER ASSEMBLY FOR WIRE BOX

(71) Applicant: Sigma Electric Manufacturing Corporation, Garner, NC (US)

(72) Inventors: Vinayak Manohar Chavan, Maharashtra (IN); Prashant Balkrishna Jade, Maharashtra (IN); Mustaq Mahamad Hanif Naikwadi, Maharashtra (IN)

(73) Assignee: SIGMA ELECTRIC MANUFACTURING CORPORATION, Garner, NC (US)

( * ) Notice: Subject to any disclaimer, the term of this patent is extended or adjusted under 35 U.S.C. 154(b) by 126 days.

(21) Appl. No.: 16/952,853

(22) Filed: Nov. 19, 2020

(65) Prior Publication Data
US 2021/0159681 A1 May 27, 2021

Related U.S. Application Data

(60) Provisional application No. 62/938,520, filed on Nov. 21, 2019.

(51) Int. Cl.
*H02G 3/14* (2006.01)
*F16C 11/06* (2006.01)

(52) U.S. Cl.
CPC .......... *H02G 3/14* (2013.01); *F16C 11/0604* (2013.01)

(58) Field of Classification Search
CPC ............ H02G 3/08; H02G 3/081; H02G 3/14; H05K 5/00; H05K 5/02; H05K 5/0217; H05K 5/03; H01R 13/46

USPC .......... 174/50, 53, 57, 58, 66, 67, 480, 481; 220/3.2–3.9, 4.02, 241, 242; 439/536, 439/535

See application file for complete search history.

(56) References Cited

U.S. PATENT DOCUMENTS

| | | | |
|---|---|---|---|
| 5,280,135 A | 1/1994 | Berlin et al. | |
| 6,133,531 A * | 10/2000 | Hayduke | H02G 3/081 174/67 |
| 6,437,242 B1 * | 8/2002 | Radosavljevic | H02G 3/14 174/67 |
| 6,891,104 B2 * | 5/2005 | Dinh | H02G 3/14 174/66 |
| 7,129,413 B1 * | 10/2006 | Rao | H02G 3/14 174/67 |
| 7,449,634 B1 * | 11/2008 | Shotey | H02G 3/14 174/67 |
| 7,462,777 B2 * | 12/2008 | Dinh | H02G 3/088 174/67 |

(Continued)

*Primary Examiner* — Angel R Estrada
(74) *Attorney, Agent, or Firm* — Cantor Colburn LLP

(57) ABSTRACT

Disclosed is a while-in-use cover assembly for an electric wire box, having: a base having a front surface and a bottom surface; a lid that selectively covers the base front surface, wherein a first geometric shape is formed by a top profile of the lid, and the while-in-use cover assembly is confined to the first geometric shape when closed; and a ball-joint connecting the lid and the base, wherein the lid can pivot relative to the base, about the ball-joint, for positioning the lid against the base and away from the base, wherein: when the lid is positioned against the base the while-in-use cover assembly is closed; and when the lid is positioned away from the base, the while-in-use cover assembly is opened.

20 Claims, 10 Drawing Sheets

(56) References Cited

U.S. PATENT DOCUMENTS

| | | | |
|---|---|---|---|
| 7,598,452 B1 * | 10/2009 | Shotey | H01R 13/652 |
| | | | 174/67 |
| 7,977,572 B1 * | 7/2011 | Shotey | H02G 3/14 |
| | | | 174/67 |
| 9,437,959 B2 * | 9/2016 | Sathyanarayana | H02G 3/14 |
| 9,800,032 B2 * | 10/2017 | Jolly | H02G 3/14 |

* cited by examiner

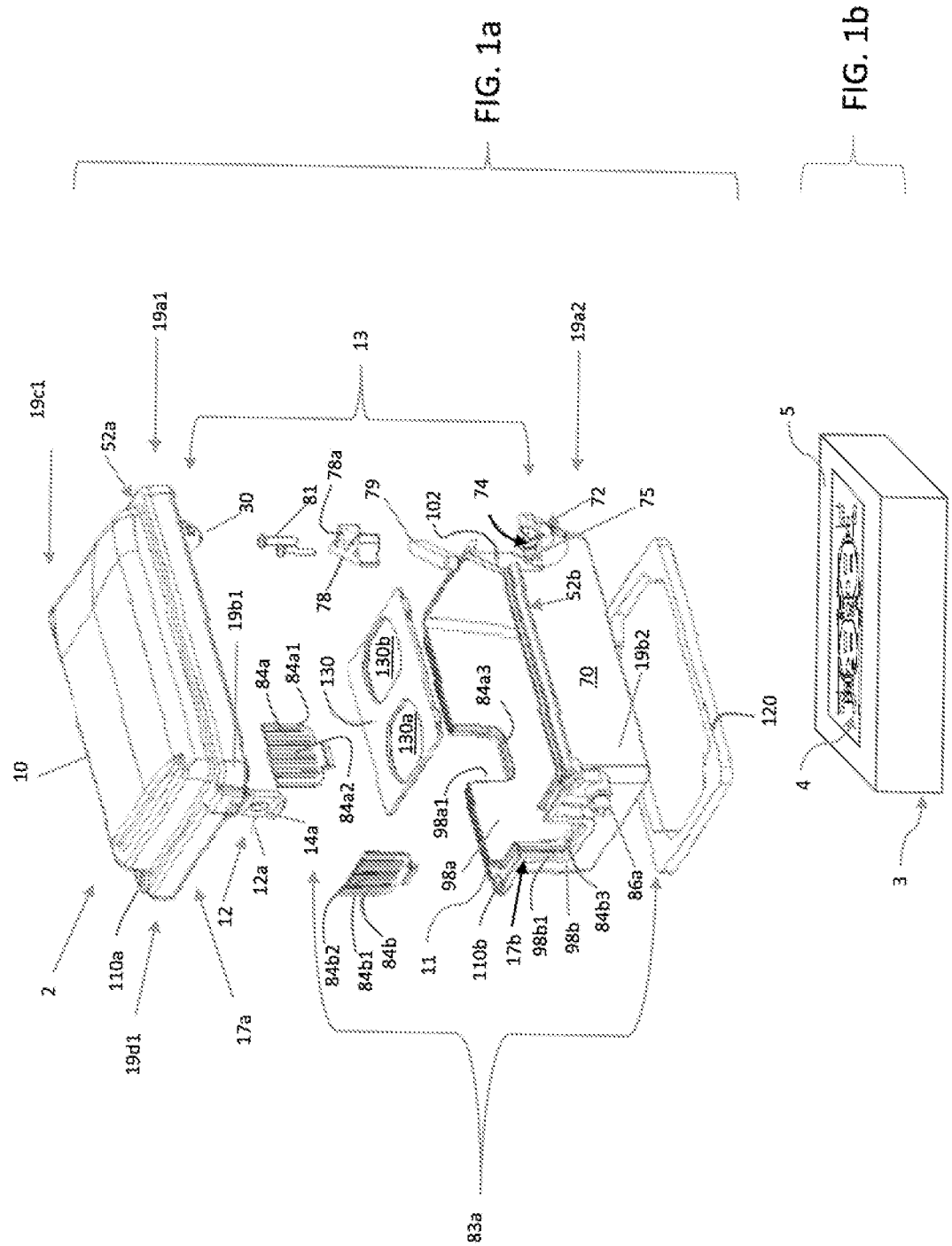

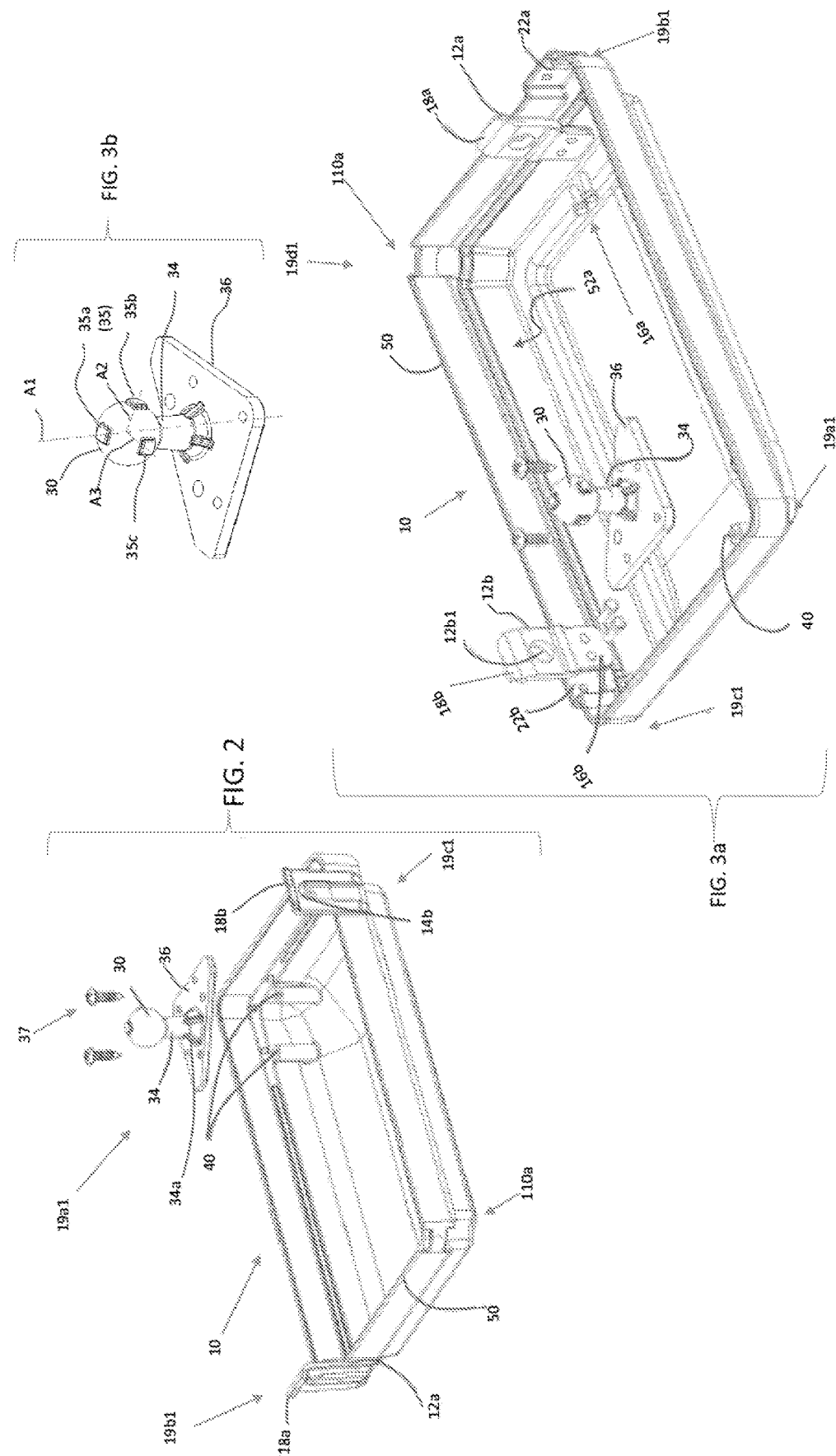

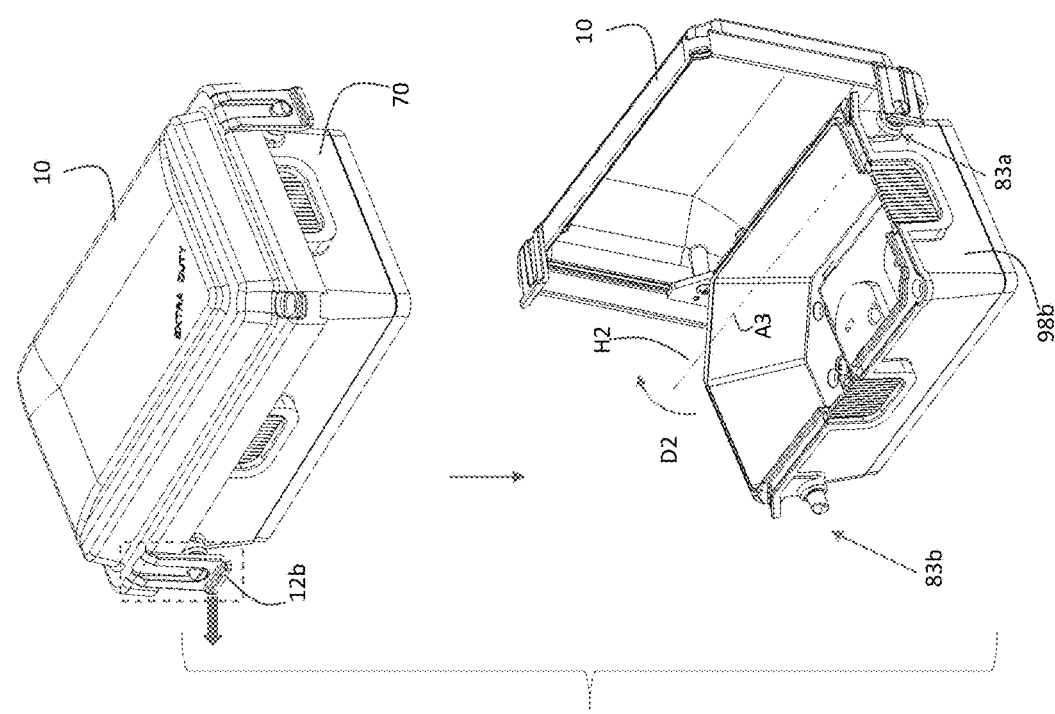
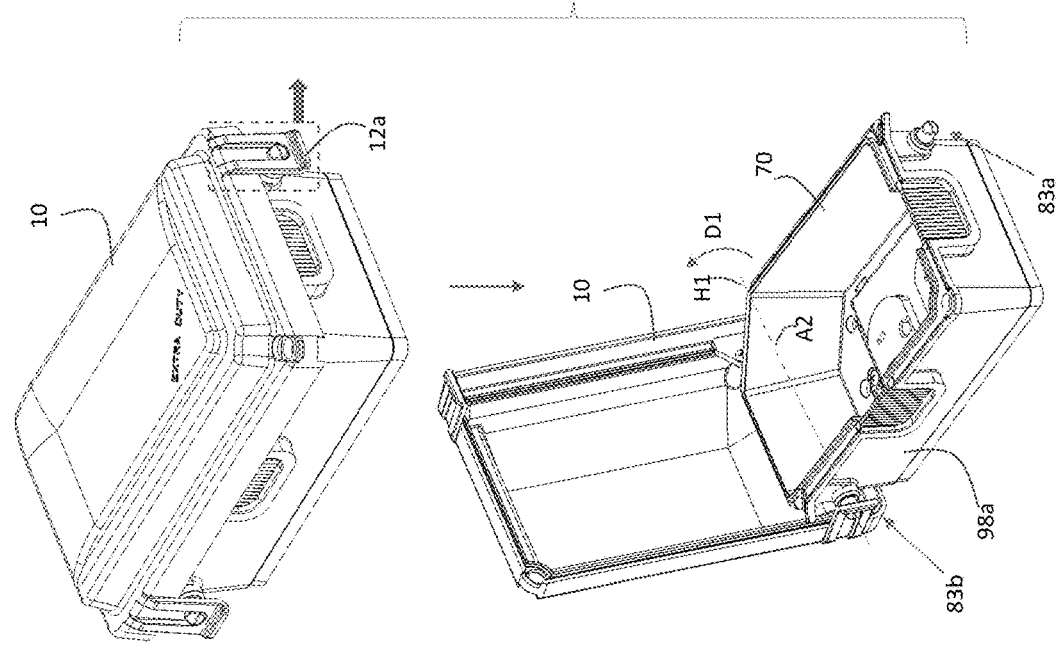

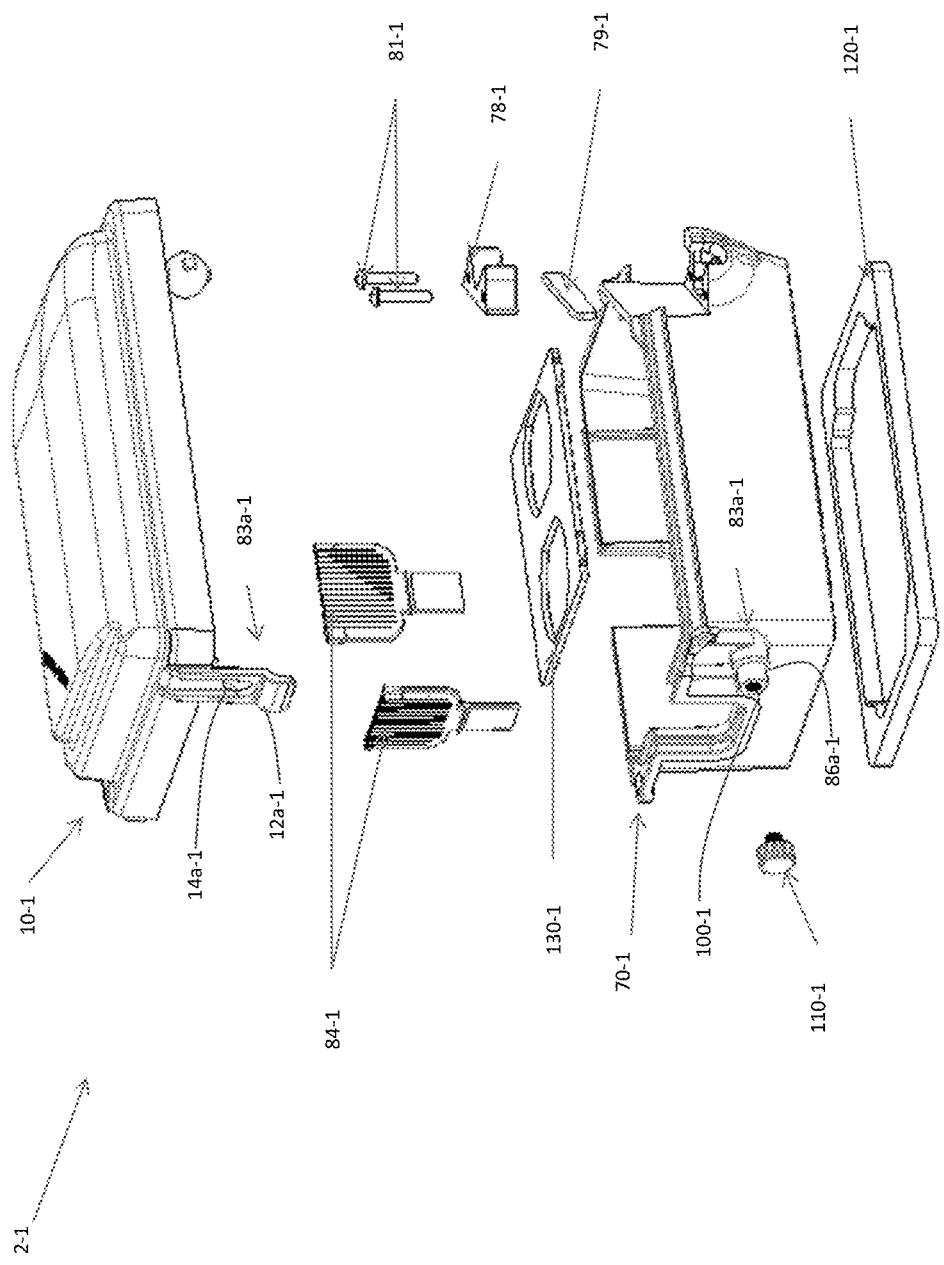

WHILE-IN-USE COVER ASSEMBLY FOR WIRE BOX

CROSS REFERENCE TO RELATED APPLICATIONS

This application claims the benefit of an earlier filing date from U.S. Provisional Application Ser. No. 62/938,520 filed Nov. 21, 2019, the entire disclosure of which is incorporated herein by reference

TECHNICAL FIELD

The instant application relates to a while-in-use cover assembly for wire boxes, outlet boxes, or other enclosures, and, more particularly, to a while-in-use cover assembly with a pivot connection between a lid and a base of the while-in-use cover assembly.

BACKGROUND

Wire boxes for containing electrical outlet connections are known and typically include a housing with one or more plug receptacles for insertion of standard electrical plugs based upon either the country and/or the voltage. Wiring entering an outlet box is typically connected to a particular electrical fixture or receptacle such as a lighting fixture, electrical outlet, or switch.

The National Electric Code (NEC), followed by most state and city governments in the United States, mandates the use of while-in-use covers for electrical boxes used outdoors. Exterior wire boxes often have covers seeking to shield the electrical boxes from weather-related contaminants such as dust and water while connected to various electrical devices or not. These covers are generally designated while-in-use covers and have a profile that protrudes outward in an arc (having a convex lid) from the electrical box (also known as a bubble cover).

There remains a need for while-in-use covers that can be utilized with the lid closed, and can open in both the horizontal and vertical directions, and preferably that do not have a bubble lid, yet can be closed while in use.

BRIEF SUMMARY

Disclosed is a while-in-use cover assembly for an electric wire box, having: a base having a front surface and a bottom surface; a lid that selectively covers the base front surface, wherein a first geometric shape is formed by a top profile of the lid, and preferably, the while-in-use cover assembly is confined to the first geometric shape when closed; and a ball joint connecting the lid and the base, wherein the lid can pivot relative to the base, about the ball-joint, for positioning the lid against the base and away from the base, wherein: when the lid is positioned against the base the while-in-use cover assembly is closed; and when the lid is positioned away from the base, the while-in-use cover assembly is opened.

Further disclosed is a method of operating a while-in-use cover assembly, having: engaging a first snap assembly to disconnect a first side wall of a base and a lid, and pivoting the lid in a direction about a hinge formed between a second snap assembly and a ball joint; or engaging the second snap assembly to disconnect a second side wall of the base and the lid, and pivoting the lid in another direction about another hinge formed between the first snap assembly and the ball joint, wherein the direction and the other direction are perpendicular to one another, and wherein: a first geometric shape is formed by a top profile of the lid, and the while-in-use cover assembly is confined to the first geometric shape when closed.

There remains a need for while-in-use covers that can be utilized and can open in both the horizontal and vertical directions, and preferably that do not have a bubble lid, yet can be closed while in use.

BRIEF DESCRIPTION OF THE DRAWINGS

Without limiting the scope as claimed below and referring now to the drawings and figures:

FIG. 1a is a top perspective exploded view of a while-in-use cover assembly, not to scale;

FIG. 1b is a top perspective of a junction box that is configured for being covered by the while-in-use cover assembly of FIG. 1a;

FIG. 2 is a bottom perspective exploded view of components of an embodiment of the while-in-use cover assembly, not to scale, showing a lid of the while-in-use cover assembly separated from a base for clarity;

FIG. 3a is another bottom perspective exploded view of components of an embodiment of the while-in-use cover assembly, not to scale, showing the lid of the while-in-use cover assembly separated from the base for clarity;

FIG. 3b is a perspective view of a components of an embodiment of the while-in-use cover assembly, not to scale, showing the ball separated from the lid for clarity;

FIG. 4d is a perspective view of an embodiment of the while-in-use cover assembly, not to scale, showing the while-in-use cover assembly closed and opened by pivoting the lid in a vertical direction relative the base for clarity;

FIG. 4e is a perspective view of an embodiment of the while-in-use cover assembly, not to scale, showing the while-in-use cover assembly closed and opened by pivoting the lid in a horizontal direction relative the base for clarity;

FIG. 8 is a top perspective exploded view of a while-in-use cover assembly, not to scale, according to another embodiment;

DETAILED DESCRIPTION

Figure 4B:
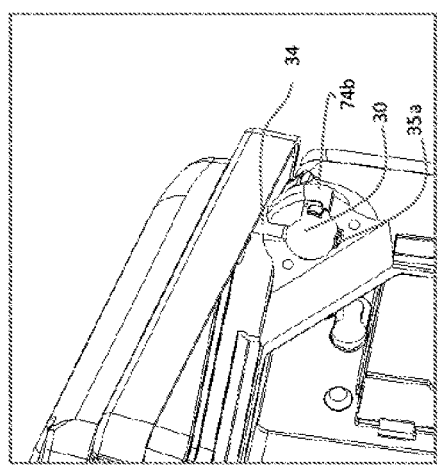
FIG. 4b is a perspective view of a section of an embodiment of the while-in-use cover assembly, not to scale, showing additional aspects of the lid and the base for clarity.

Disclosed herein is a while-in-use cover assembly that can be attached to an electric box that is itself attached to a structure (e.g., to an exterior structure). The while-in-use cover assembly can comprise a base and a lid and an adaptor plate that can be attached to the base. The base and the lid may be connected by a ball-socket joint, enabling an easy opening, closing and manipulating of the lid relative to the base. The while-in-use cover assembly disclosed herein can solve the problem of a while-in-use cover that can open both vertically and horizontally while having a rectangular footprint. In other words, from a front view, with the lid in the closed position, the shape of the cover is rectangular. Preferably, the lid is rectangular and obscures the view of the ball joint when in the closed position.

Referring to FIGS. 1-7, a while-in-use cover assembly 2 (e.g., FIG. 1a) is illustrated that is configured for being fitting to an electric wire box (also known as a junction box) 3 (FIG. 1b), which may be an electric junction box. The electric wire box 3 may have therein a current device 4. The current device 4 may be a duplex receptacle or switch. The current device 4 is positioned to be substantially flush with a box front-edge or box front-surface 5 of the electric wire box 3.

The while-in-use cover assembly 2 has a base 70. The base 70 is configured to connect to the box front-surface 5 of the electric wire box 3. The base 70 covers the current device 4 when the while-in-use cover assembly 2 is closed and exposes the current device 4 when the while-in-use cover assembly 2 is opened. A lid 10 is configured to connect to a base front-edge or a base front surface 11, i.e., of the base 70. The lid 10 is configured to pivot relative to the base 70 to open and close the while-in-use cover assembly 2.

Figure 6:
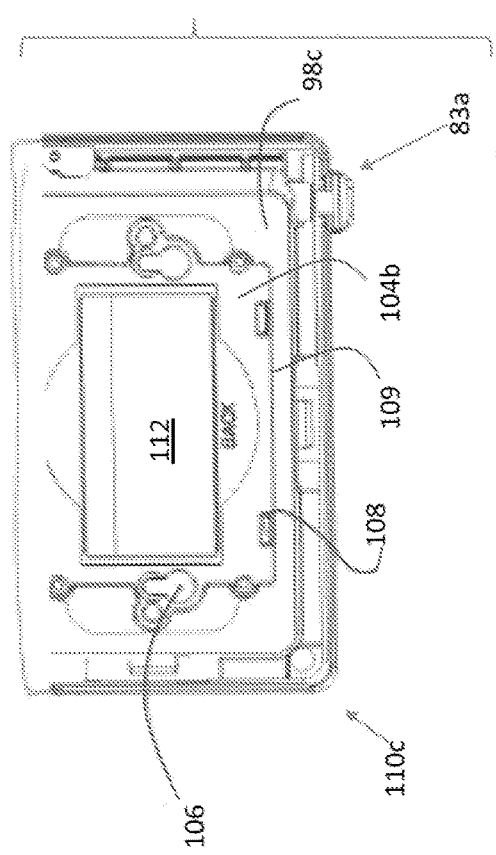
FIG. 6 is a top perspective view of components of an embodiment of the while-in-use cover assembly, not to scale, showing the lid and the base assembled and wherein the lid is closed against the base, for clarity.
Figure 7:
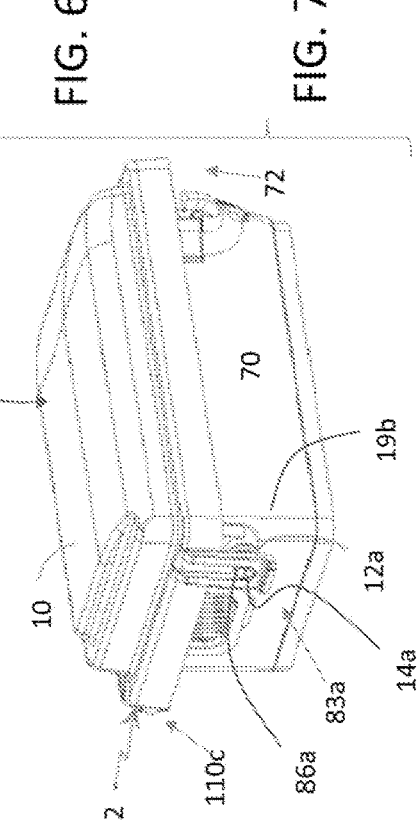
FIG. 7 is another top perspective view of components of an embodiment of the while-in-use cover assembly, not to scale, showing the lid and the base assembled and wherein the lid is closed against the base, for clarity.

A ball joint 13 connects the lid 10 and the base 70. The lid 10 is configured for being pivoted about the ball joint 13. This configuration enables positioning the lid 10 against the base 70 to close the while-in-use cover assembly 2 against the electric wire box 3. For example, the lid 10 may pivot by greater than ninety-five degrees, and in one embodiment may pivot ninety-eight degrees. An assembly cavity 15 is formed by the while-in-use cover assembly 2 when closed (FIGS. 6 and 7). When closed, access to the current device 4 is prevented. This configuration also enables positioning the lid 10 away from the base 70 to open the while-in-use cover assembly 2. When opened, access to the current device 4 is provided. Embodiments without the ball joint 13 are within the scope of the disclosure.

While the lid 10 does not have any particular design requirements, in one embodiment the lid 10 and base 70 each have a rectangular front-profile generally referred to as 17. All features of the while-in-use cover assembly 2 are substantially confined within the rectangular front-profile when the while-in-use cover assembly 2 is closed. That is, the lid 10 includes a lid front-profile 17a and the base 70 includes a base front-profile 17b. The lid 10 and base 70 each includes a first-corner generally referred to as 19a. Specifically, as illustrated e.g., FIG. 4, at the first-corner 19a, the lid includes a lid first-corner 19a1 and the base 70 includes a base first-corner 19a2. The ball joint 13 is proximate the first-corner 19a. With this configuration, the lid 10 is pivoted about the first-corner 19a while being engaged to open or close the while-in-use cover assembly 2. As illustrated in FIG. 4, the first-corner 19a defines a bevel surface 102 such that a latch 12 (identified below) fits within a rectangular profile of the base 70 and generally within a same profile defined by the electric wire box 3. The rectangular profile of the while-in-use cover assembly 2 may ensure a proper orientation during installation. It is to be appreciated that a rectangular profile is one form of geometric profile and more specifically a symmetric polygon, however the scope of the disclosure is not limited to a rectangular shaped lid.

Referring again generally to the figures, the ball joint 13 includes a ball 30 connected to the lid 10 and a ball-socket 72 connected to the base 70. The ball 30 is configured for swiveling in the ball-socket 72 when the lid 10 is pivoted to open or close the while-in-use cover assembly 2.

As shown in FIGS. 2, 3a and 3b, the ball 30 includes a ball-platform 36 that is connected to the lid 10 by one or more platform-fasteners 37. The ball-platform 36 maintains a position of the ball 30 relative to the lid 10 when the lid 10 is pivoted relative to the base 70 to open or close the while-in-use cover assembly 2. The platform-fasteners 37 may be screws that fit into screw-holes 40 in the lid 10. In addition, the ball 30 is spaced from the ball-platform 36 by a stem 34 that extends along a first axis A1. The stem 34 has a substantially cylindrical shape. The stem 34 forms a hinge-pin and it includes ridges 34a (FIG. 2) at its ball-platform 36 which make the profile of the stem 34 slightly wider at the ball-platform 36 and helps maintain the orientation of the ball joint 13 when closed.

A plurality of guide tabs 35 is formed on the ball 30, including a first guide tab 35a, a second guide tab 35b and a third guide tab 35c. The first guide tab 35a extends from the ball 30 along the first axis A1, the second guide tab 35b extends along a second axis A2 and the third guide tab 35c extends along a third axis A3. The axes A1, A2, A3 are perpendicular to one another.

Figure 4C:
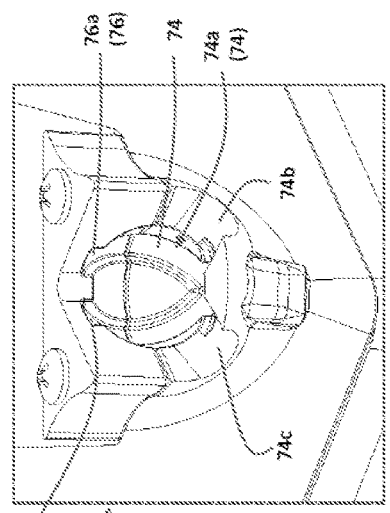
FIG. 4c is a perspective view of a section of an embodiment of the while-in-use cover assembly, not to scale, showing additional aspects of a ball-socket in the base for clarity.
Figure 4A:
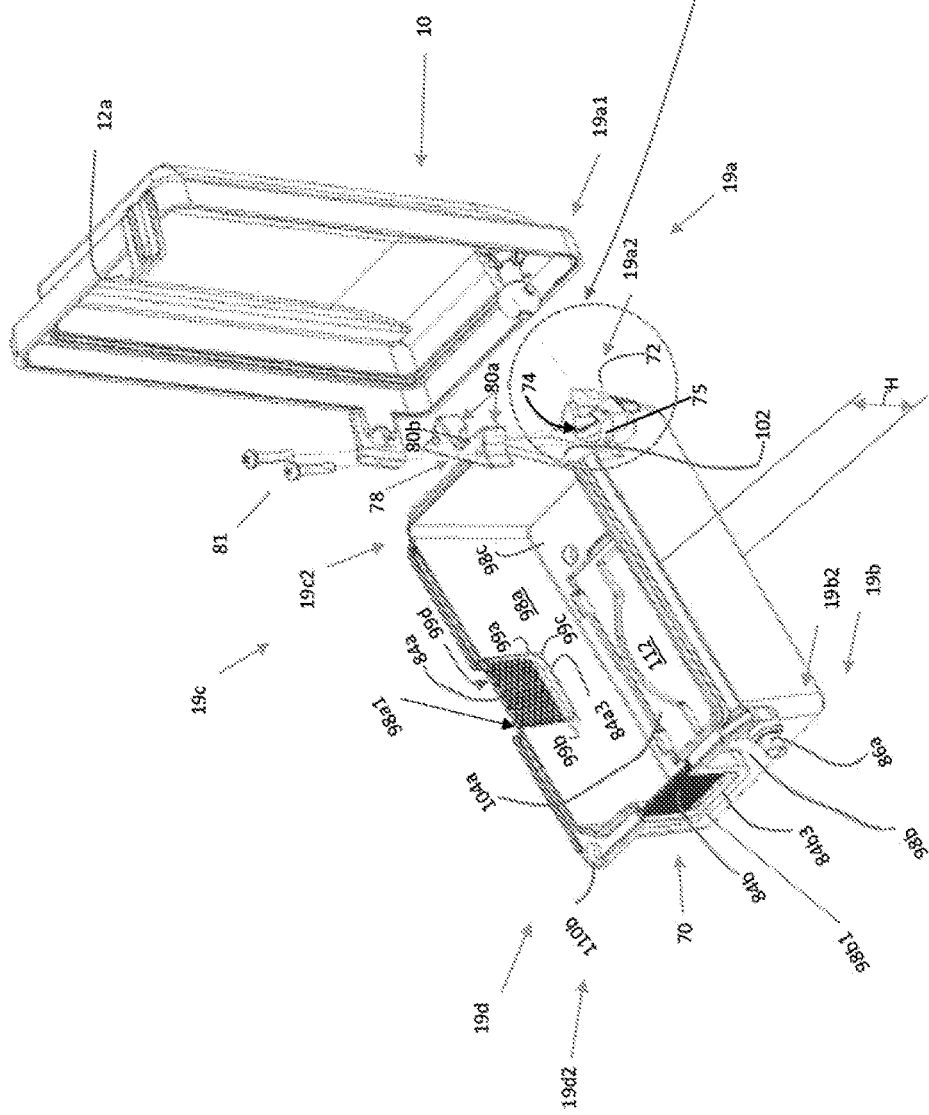
FIG. 4a is another top perspective exploded view of components of an embodiment of the while-in-use cover assembly, not to scale, showing additional aspects of the lid and the base for clarity.

As shown in FIGS. 4a-4c, the ball-socket 72 includes a socket-cavity 74 that includes a semi-spherical portion 74a that receives the ball 30, and neck portions 74b, 74c that are perpendicular to one another. The neck portions 74b, 74c each receive the stem 34 when the lid 10 is pivoted against the base 70 in ones of a first (vertical) direction D1 (FIG. 4*d*) and a second (horizontal) direction D2 (FIG. 4*e*).

Figure 4F:
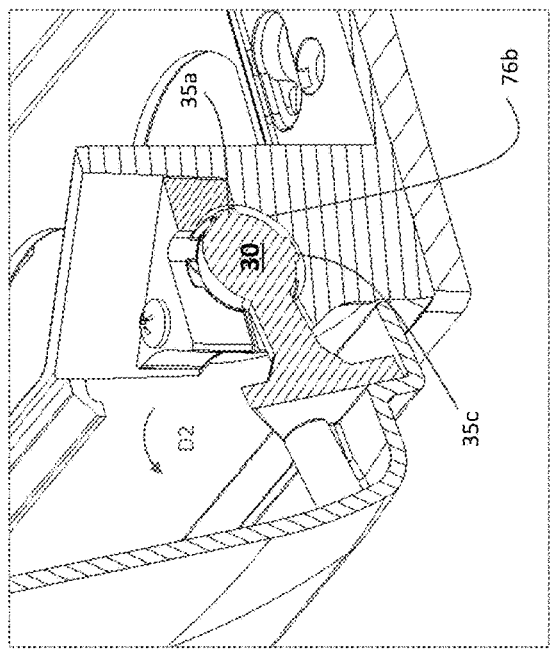
FIG. 4f is perspective view of a section of an embodiment of the while-in-use cover assembly, not to scale, showing the while-in-use cover assembly opened by pivoting the lid in a vertical direction relative the base for clarity.
Figure 4H:
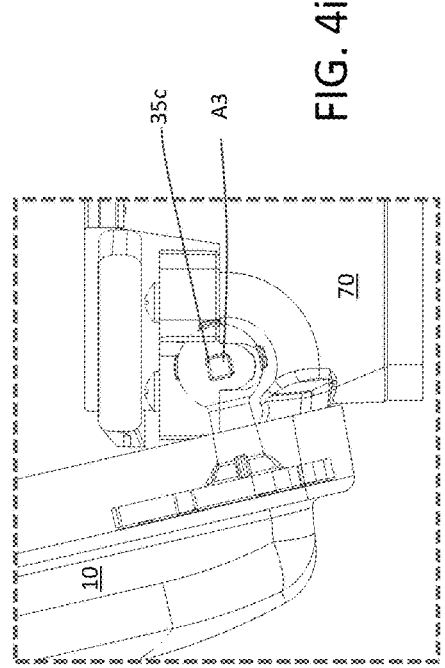
FIG. 4h is a perspective view of a section of an embodiment of the while-in-use cover assembly, not to scale, showing the while-in-use cover assembly opened by pivoting the lid in a horizontal direction relative the base for clarity.

The ball 30 may swivel in the socket-cavity 74 when the lid 10 is pivoted relative to the base 70 to open and close the while-in-use cover assembly 2. The semi-spherical portion 74*a* of the socket-cavity 74 includes a plurality of guideways 76 including a first guideway 76*a* and a second guideway 76*b*. The first guideway 76*a* is configured to receive for translating therein the first guide tab 35*a* and the third guide tab 35*c* of the ball 30 when the lid 10 pivots in the first direction D1 (FIG. 4*f*). During this time the second axis A2 extending through the second guide tab 35*b* is a pivot axis (FIG. 4*g*).

Figure 4G:
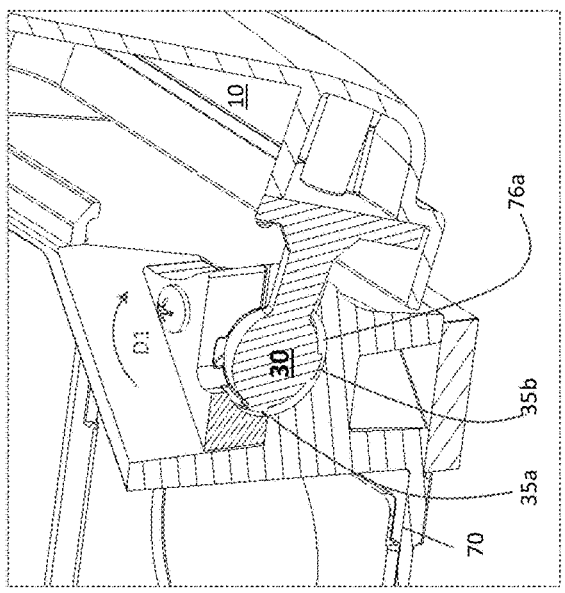
FIG. 4g is a side elevational view of a section of an embodiment of the while-in-use cover assembly, not to scale, showing the while-in-use cover assembly opened by pivoting the lid in a vertical direction relative the base for clarity.
Figure 4I:
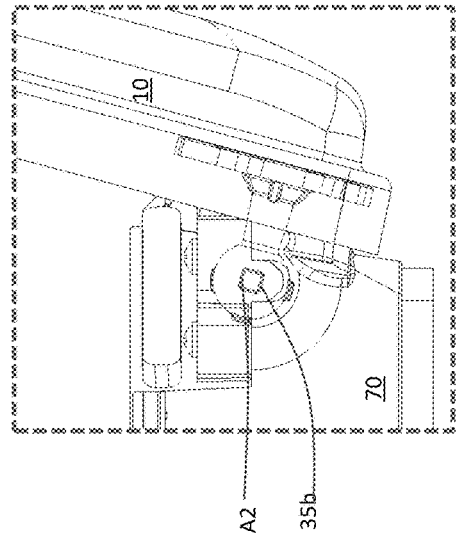
FIG. 4i is a side elevational view of a section of an embodiment of the while-in-use cover assembly, not to scale, showing the while-in-use cover assembly opened by pivoting the lid in a horizontal direction relative the base for clarity.
Figure 5:
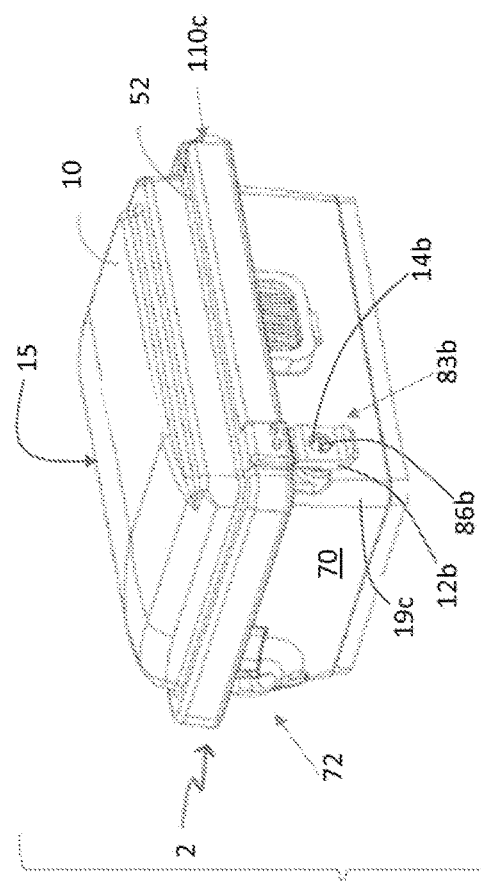
FIG. 5 is a bottom elevational view of components of an embodiment of the while-in-use cover assembly, not to scale, showing additional aspects of the base for clarity.

The second guideway 76*b* is configured to receive for translating therein the first guide tab 35*a* and the second guide tab 35*b* when the lid 10 pivots in the second direction D2 (FIG. 4*g*). During this time the third axis A3 extending through the third guide tab 35*c* is a pivot axis (FIG. 4*i*).

The ball-socket 72 includes a socket-platform 75 that seats a socket-cap 78. The socket-cap 78 defines a cap-opening 78*a* in the ball-socket that is smaller than the ball 30. This configuration secures the ball 30 within the socket-cavity 74 when the lid 10 is pivoted relative to the base 70. For example, the socket-cap 78 includes peaks 80*a* and a trough therebetween 80*b*, forming a substantially triangular saw-tooth wave. The trough defines a seat in the cap-opening 78*a* for seating the stem 34 in the socket-cap 78 when pivoting the lid 10 relative to the base 70.

A socket-gasket 79 is seated between the socket-cap 78 and the socket-platform 75. The socket-gasket 79 prevents contaminants, such as dust and water, from entering the inside assembly cavity 15 of the while-in-use cover assembly 2 formed by the base 70 and the lid 10 when closed. Socket-fasteners 81 secure the socket-cap 78 and the socket-platform 75 to one another. With this configuration the socket-cap 78 remains fixed to the base 70 when opening or closing the while-in-use cover assembly 2.

Turning to FIGS. 4*d* and 5-7, a first snap assembly 83*a* connects the base 70 and the lid 10 when the while-in-use cover assembly 2 is closed. In addition, the first snap assembly 83*a* pivotally connects a first side wall 98*a* and the lid when the lid 10 pivots in the first direction D1 (FIG. 4*d*). With this configuration a first hinge H1 is defined along the second axis A2 by the ball joint 13 and the first snap assembly 83*a* when the lid 10 pivots in the first direction D1.

The first snap assembly 83*a* includes a first boss 86*a* fixed to the base 70. A first resilient tab 12*a* (generally referred to as a latch 12) is fixed to the lid 10. The lid 10 may include a first offset 22*a* for flush-seating the first resilient tab 12*a* against an inside 52 of the lid 10. The first resilient tab 12*a* may be fixed to the lid 10 by first tab-fasteners 16*a*. The first tab-fasteners 16*a* may be screws (FIG. 3*a*). The first resilient tab 12*a* may extend below a bottom edge 50 of the lid 10, where the first resilient tab 12*a* defines a first tab-opening 14*a*. The first boss 86*a* extends through the first tab-opening 14*a* for connecting the base 70 and the lid 10.

According to the embodiments, outwardly biasing the first resilient tab 12*a* disengages from the first boss 86*a*. Once disengaged, the lid 10 is configured for being pivoted relative to the base 70 to open the while-in-use cover assembly 2. The first resilient tab 12*a* may include a first outward contour surface 18*a* that may be engaged by the first boss 86*a* while closing the while-in-use cover assembly 2. When the first outward contour surface 18*a* is engaged, the first resilient tab 12*a* is biased outwardly so that the first boss 86*a* may move against it until reaching the first tab-opening 14*a*.

The lid 10 and base 70 each includes a second-corner generally referred to as 19*b*. Specifically, at the second-corner, the lid 10 includes a lid-second-corner 19*b*1 and the base 70 includes a base second-corner 19*b*2. The first snap assembly 83*a* is proximate the second-corner 19*b*. At the second-corner 19*b*, the first resilient tab 12*a* of the lid 10 engages the first boss 86*a* of the base 70, e.g., when pivoting the lid 10 about the first-corner 19*a*, to close the while-in-use cover assembly 2.

Turning to FIGS. 4*e* and 5-7, a second snap assembly 83*b* connects the base 70 and the lid 10 when the while-in-use cover assembly 2 is closed. In addition, the second snap assembly 83*b* pivotally connects a second side wall 98*b* and the lid 10 when the lid 10 pivots in the second direction D2 (FIG. 4*e*). With this configuration a second hinge H2 is defined along the third axis A3 by the ball joint 13 and the second snap assembly 83*b* when the lid 10 pivots in the second direction D2.

The second snap assembly 83*b* includes a second boss 86*b* fixed to the base 70. A second resilient tab 12*b* is fixed to the lid 10. The lid 10 may include a second offset 22*b* for flush-seating the second resilient tab 12*b* against the inside 52 of the lid 10. The second resilient tab 12*b* may be fixed to the lid 10 by second tab-fasteners 16*b*. The second tab-fasteners 16*b* may be screws (FIG. 3*a*). The second resilient tab 12*b* may extend below the bottom edge 50 of the lid 10, where second resilient tab 12*b* defines a second tab-opening 14*b*. The second boss 86*b* extends through the second tab-opening 14*b* for connecting the base 70 to the lid 10. Outwardly biasing the second resilient tab 12*b* disengages the second resilient tab 12*b* from the second boss 86*b*. It is to be appreciated that with the first snap assembly 83*a* and the second snap assembly 83*b*, each side of the while-in-use cover assembly 2 that is opposite of the ball joint 13 is configured with a snap-fit, i.e., to snap closed.

The lid 10 and base 70 each includes a third-corner generally referred to as 19*c* (FIGS. 2, 4*a*). Specifically, at the third-corner 19*c*, the lid 10 includes a lid third-corner 19*c*1 and the base 70 includes a base third-corner 19*c*2. The second snap assembly 83*b* is proximate the third-corner 19*c*. The second resilient tab 12*b* may include a second outward contour surface 18*b* that may be engaged by the second boss 86*b* while closing the while-in-use cover assembly 2.

The lid 10 and base 70 each includes a fourth-corner generally referred to as 19*d*. Specifically, at the fourth-corner 19*d*, the lid includes a lid fourth-corner 19*d*1 and the base 70 includes a base fourth-corner 19*d*2. The lid fourth-corner 19*d*1 defines a first lock channel 110*a* and the base fourth-corner 19*d*2 defines a second lock channel 110*b*. The first lock channel 110*a* and the second lock channel 110*b* are aligned when the lid 10 is closed over the base 70. This configuration forms a continuous lock channel 110*c*. A lock (not shown) may be inserted into the continuous lock channel 110*c* (e.g. a corner lock) to selectively lock the lid 10 against the base 70.

The first side wall 98*a* defines a first recess 98*a*1 for receiving a first insert 84*a*. The cable of an electric plug (not shown) may be passed through the first recess 98*a*1 to engage the current device 4 when the while-in-use cover assembly 2 is closed. The first insert 84*a* defines a first tongue perimeter-profile 84*a*1, at least along the opposing edges 99*a*, 99*b* extending in the height-wise direction H (FIG. 4). The bottom edge 99*c* extending between the opposing edges 99*a*, 99*b* may or may not have the first tongue perimeter-profile 84*a*1. The first recess 98*a*1 defines a first groove perimeter-profile 84*a*3. The first insert 84*a* is configured to slide into the first recess 98*a*1 for fixing the first insert 84a and the first side wall 98a to one another. The first recess 98a1 may be larger, side-to-side, at a top edge 99d compared with the bottom edge 99c (FIG. 4). This enables the first insert 84a, which is formed of a flexible material (discussed below), to be securely slid into the first recess 98a1. This also provides a water run-off contour to the first recess 98a1.

A first exterior surface 84a2 of the first insert 84a defines a first eyelash surface contour. The contour provides a texture that is configured to be selectively gripped for removing the first insert 84a from the first recess 98a1. The first insert 84a is elastomeric flexible cut-eye-last like structure (e.g., rubber). Thus, the cable of the electric plug may be passed through the first recess 98a1 when the while-in-use cover assembly 2 is closed and the electric plug is plugged in a receptacle covered by the while-in-use assembly 2. The material of the first insert 84a, and the fit within the base 70, will keep dirt and insects out of the while-in-use cover assembly 2 when closed.

The second side wall 98b defines a second recess 98b1, which may be configured similarly to the first recess 98a1, for receiving a second insert 84b. With this configuration another cable of another electric plug (not shown) may be passed through the second recess 98b1 to engage the current device 4 when the while-in-use cover assembly 2 is closed and the electric plug is plugged in a receptacle covered by the while-in-use assembly 2. The second insert 84b defines a second tongue perimeter-profile 84b1. The second recess 98b1 defines a second groove perimeter-profile 84b3. The second insert 84b is configured to slide into the second recess 98b1 for fixing the second insert 84b and the second side wall 98b to one another. A second exterior surface 84b2 of the second insert 84b defines a second eyelash surface contour. Together the inserts 84a, 85b are generically referred to as the inserts 84.

The depth of the base 70 of the while-in-use assembly 2 is large enough to accommodate a head of the electric plug extending into the while-in-use assembly 2 and a bend radius for the electric cable, which extends through the first recesses 98a1 or the second recess 98b1 (depending on use of the while-in-use assembly 2). With this configuration, the lid 10 may define a low profile, for example with a substantially planar outer surface, e.g., that does not form a bubble to fit any part of the electric cable within the while-in-use assembly 2. For example, a depth of the lid 10 may be between 10% and 40%, preferably 10% to 25%, of the depth of the base 70 (the depth being defined in a direction extending between the front surface 11 and a bottom surface 98c of the base 70.

The lid 10 and base 70 have a lip generally referred to as 52 that surrounds a perimeter of the while-in-use cover assembly 2. The lip 52 is larger than a remainder of the while-in-use cover assembly 2 and is located where the lid 10 and base 70 meet when the while-in-use cover assembly 2 is closed. The lip 52 is configured so that a lid-lip 52a forms an exterior-portion of the lip 52 and a base-lip 52b forms an interior portion of the lip 52. That is, when the while-in-use cover assembly 2 is closed, the lid-lip 52a surrounds the base-lip 52b. This configuration spaces the resilient tabs, generally referred to as 12, outwardly from the base 70. The bosses, generally referred to as 86, are long enough to extend through the tab-openings generally referred to as 14.

A bottom surface 98c of the base 70 has a cutout 112 that defines a receptacle-opening. Surrounding the cutout 112 is a first area 104a having a thickness-recess. An adaptor plate 130 is configured for being positioned against the cutout 112 in the first area 104a. A thickness of the adaptor plate 130 may be such that it does not extend, thickness-wise, into the base 70 beyond the bottom surface 98c. The adaptor plate 130 defines one or more plate-openings generally referred to as 130. For example, when the current device 4 is a duplex receptacle or switch, the adaptor plate 140 includes a first plate-opening 130a and a second plate-opening 130b that fit around face contours of the duplex. Thus, the adaptor plate 130 forms a cover plate for the current device 4 in the electric wire box 3.

The bottom surface 98c includes fastener holes 106, otherwise known as keyhole slots, through which fasteners (not shown) such as screws may extend to secure the base 70 to the electric wire box 3. The first area 104a does not overlap with the fastener holes 106. Such fasteners may extend, for example into threaded slots to which the current device 4 is installed in typical fashion. Standoffs 108 on the bottom surface 98c function as knock-out engagement points. This enables a utilization of the while-in-use cover assembly 2 that requires removing a second area 104b of the bottom surface 98c that has been scored for removal with score lines 109.

A base-gasket 120 is configured for being positioned between the bottom surface 98c of the base 70 and the box front-surface 5 of electric wire box 3 when the while-in-use cover assembly 2 is installed against the electric wire box 3. The base-gasket 120 provides a seal between the while-in-use cover assembly 2 and the electric wire box 3, keeping out contaminants, such as dust.

The while-in-use cover assembly 2, except as identified otherwise here, may be made of plastic or metal (or similar material), and may be provided in a variety of colors. The height (e.g. in the height-wise direction H of FIG. 4) of the base 70 of the while-in-use cover assembly 2 may be scaled to multiple sizes to fit different sized plugs (e.g., large and regular sized plugs). Further, the while-in-use cover assembly 2 may be optionally manufactured for a double gang implementation.

Turning to FIG. 8, another embodiment of the while-in-use-cover assembly 2-1 (alternately referred to as the second assembly 2-1). Aspects of the second assembly 2-1 are the same as aspects of the while-in-use assembly 2 (alternately referred to as the first assembly 2) disclosed above unless identified otherwise. Illustrated in FIG. 8 is the lid 10-1 having the first snap assembly 83a-1 that includes the first tab opening 14a-1 formed in the first resilient tab 12a-1. The lid 10-1 in the second assembly 2-1 is the same as the lid 10 disclosed in the first assembly 2.

Also illustrated in FIG. 8, having aspects including the base 70-1 having the eyelash inserts 84-1, the adaptor plate 130-1, the base gasket 120-1, the socket fasteners 81-1, the socket cap 78-1 and the socket gasket 79-1. These aspects of the second assembly 2-1 are the same as the corresponding aspects of the first assembly 2 and engage the second assembly 2-1 in the same way as the corresponding aspects of the first assembly 2.

As seen in FIG. 8, the first snap assembly 83a-1 includes the first boss 86a-1, the outer boundary dimension of which is the same as the first boss 86a of the first snap assembly 83a of the first assembly 2. In the second assembly 2-1, the first boss 86a-1 is formed with a first bore 100-1, which may be a first threaded blind-hole or first port extending along a long axis of the first boss 86a-1. The first bore 100-1 may be configured to receive a fastener 110-1 (or thumbscrew), which may include a head end 120-1 defining an engageable knob. A shaft end 130-1 of the fastener 110-1 may define a threaded shaft configured to mate with, and be threaded into, the first axial bore 100-1. The head end 120-1 may define a diameter that is larger than the first tab opening 14a-1.

Figure 9:
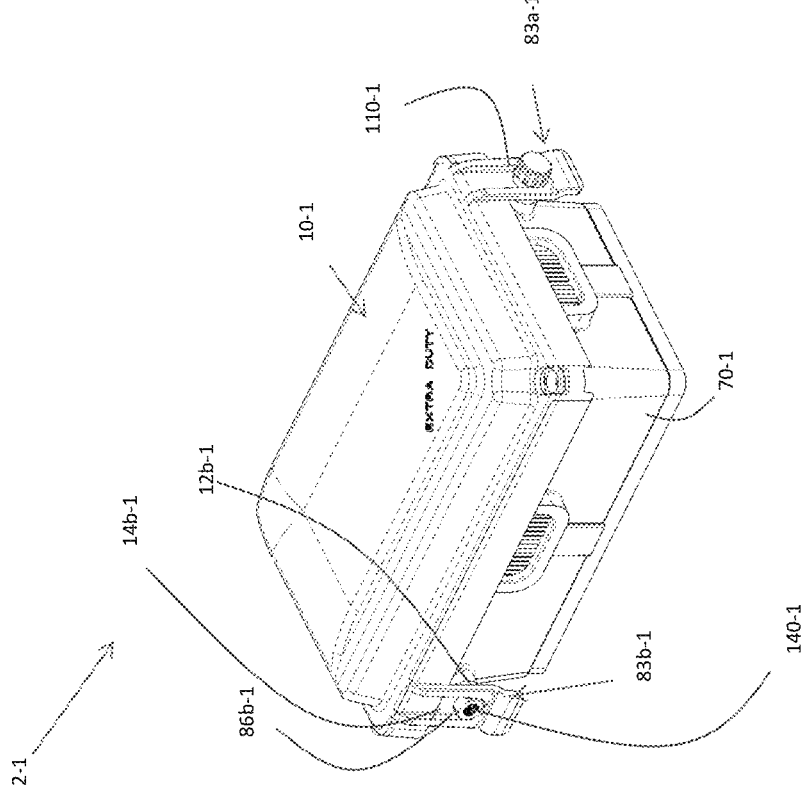
FIG. 9 is a perspective view of the embodiment of the while-in-use cover assembly of FIG. 8, not to scale, showing the while-in-use cover assembly closed, wherein the while-in-use cover assembly is configured for a horizontal installation orientation

As shown in FIG. 9, the second snap assembly 83b-1, which is configured the same as the first snap assembly 83a-1, has additional aspects including the second resilient tab 12b-1 of the lid 10-1 that forms the second tab opening 14b-1. These additional aspects of the second assembly 2-1 are the same the corresponding aspects of the first assembly 2, as indicated. The second snap assembly 83b-1 includes the second boss 86b-1 of the base 70-1, the outer boundary dimension of which is the same as the second boss 86b of the second snap assembly 84b of the first assembly 2, as indicated. The second boss 86b-1 has a second bore 140-1, which may be a second threaded blind-hole or second port extending along the long axis of the second boss 86b-1. As with the first bore 100-1, the second bore 140-1 is configured to receive the fastener 110-1.

Figure 10:
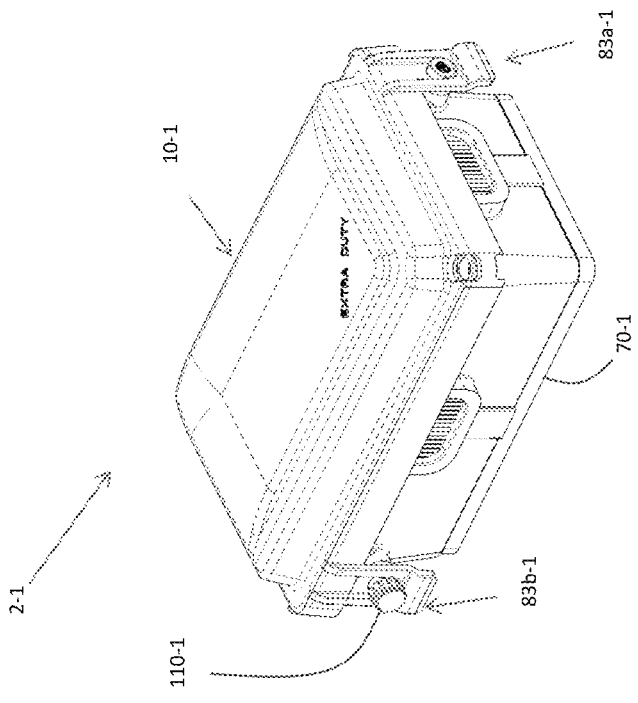
FIG. 10 is a perspective view of the embodiment of the while-in-use cover assembly of FIG. 8, not to scale, showing the while-in-use cover assembly closed, wherein the while-in-use cover assembly is configured for a vertical installation orientation.

In FIG. 9, the fastener 110-1 is removably secured to the first snap assembly 83a-1. In this configuration, the second assembly 2-1 is configured for a horizontal orientation installation in where the lid 10-1 pivots about the first snap assembly 83a-1 (see FIG. 4e). In FIG. 10, the fastener 110-1 is removably secured to the second snap assembly 83b-1. In this configuration, the second assembly 2-1 is configured for a vertical orientation installation in where the lid 10-1 pivots about the second snap assembly 83b-1 (see FIG. 4d). Of course, usage preferences could result in switching of the pivot axis in each orientation, by switching which snap assembly 83a-1, 83-1 receives the fastener 110-a, without falling outside the scope of the disclosure.

Thus, in the second assembly 2-1, the fastener 110-1 is utilized to pivotally secure the lid 10-1 to the base 70-1. This enables operation of the second assembly 2-1 without accidentally decoupling the lid 10-1 from the base 70-1 when pivoting the lid 10-1 relative to the base 70-1. The fastener 110-1 is easily fastened to either of the snap assemblies 83a-1, 83b-1, depending on a pivot access preference.

Figure 11:
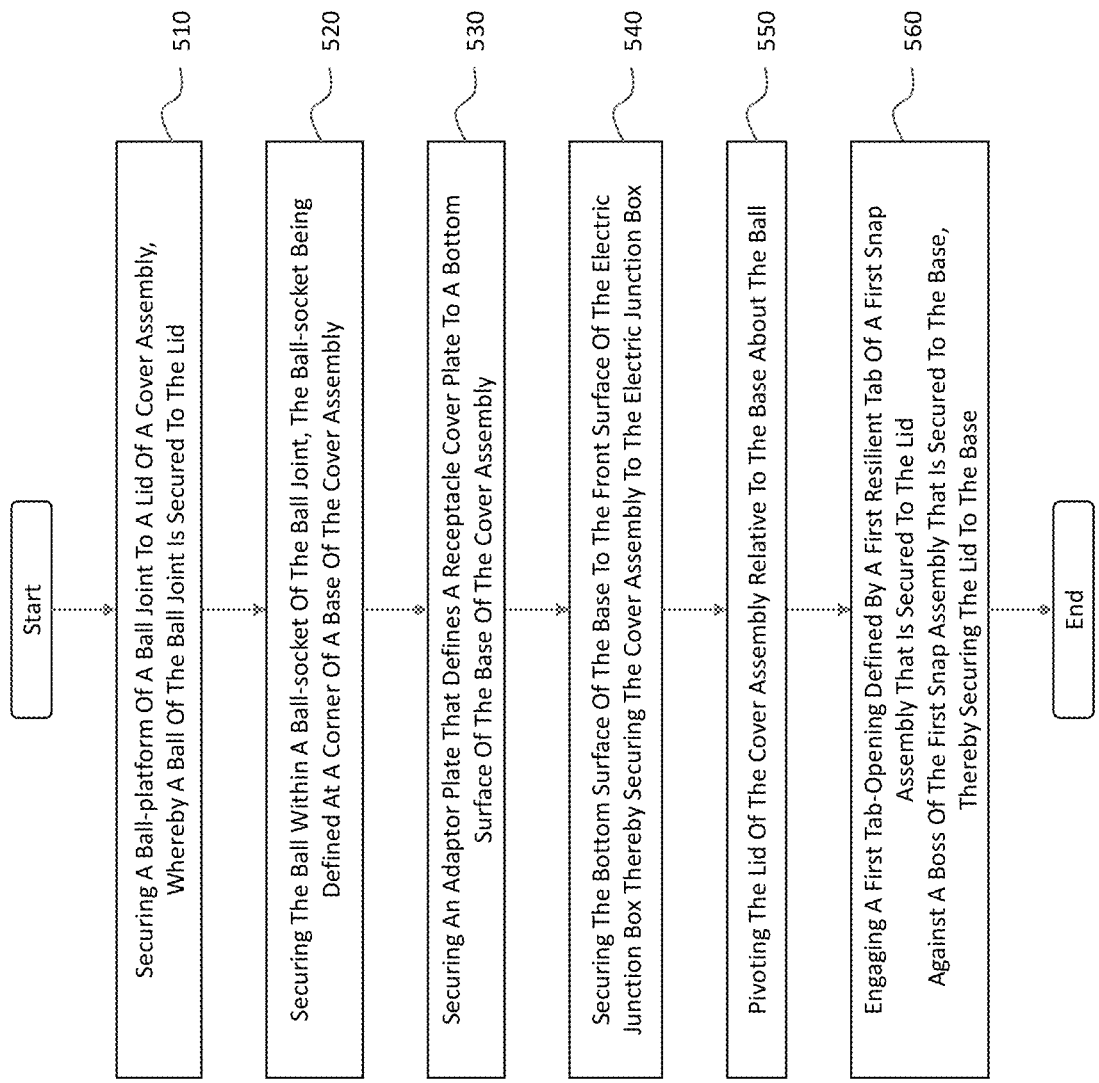
FIG. 11 shows a method of installing a while-in-use cover assembly against an electric wire box.

Turning to FIG. 11, a method is shown of installing the while-in-use cover assembly 2 against the electric wire box 3. As shown in box 510 the method includes securing the ball-platform 36 of the ball joint 13 to the lid 10 of the while-in-use cover assembly 2. From this configuration, the ball 30 of the ball joint 13 is secured to the lid 10. As shown in box 520 the method includes securing the ball 30 within the ball-socket 72 of the ball joint 13. The ball-socket 72, as indicated, is defined at the first-corner 19a of the base 70 of the while-in-use cover assembly 2. As shown in box 530 the method includes securing the while-in-use cover assembly 2 to the box front-surface 5 of the electric wire box 3.

As shown in box 530, the method includes securing the adaptor plate 130 that defines the cover plate for the current device 4 to the bottom surface 98c of the base 70 of the while-in-use cover assembly 2. As shown in box 540, the method includes securing the bottom surface 98c of the base 70 to the electric wire box 3. This secures the while-in-use cover assembly 2 to the electric wire box 3.

As illustrated in box 550, the method includes pivoting the lid 10 of the while-in-use cover assembly 2 against the base 70 of the while-in-use cover assembly 2 about the ball 30. As illustrated in box 560, the method includes engaging the first tab-opening 14a defined by first resilient tab 12a of the first snap assembly 83a that is secured to the lid 10 against the first boss 86a of the first snap assembly 83a that is secured to the base 70. This secures the lid 10 to the base 70.

Figure 12:
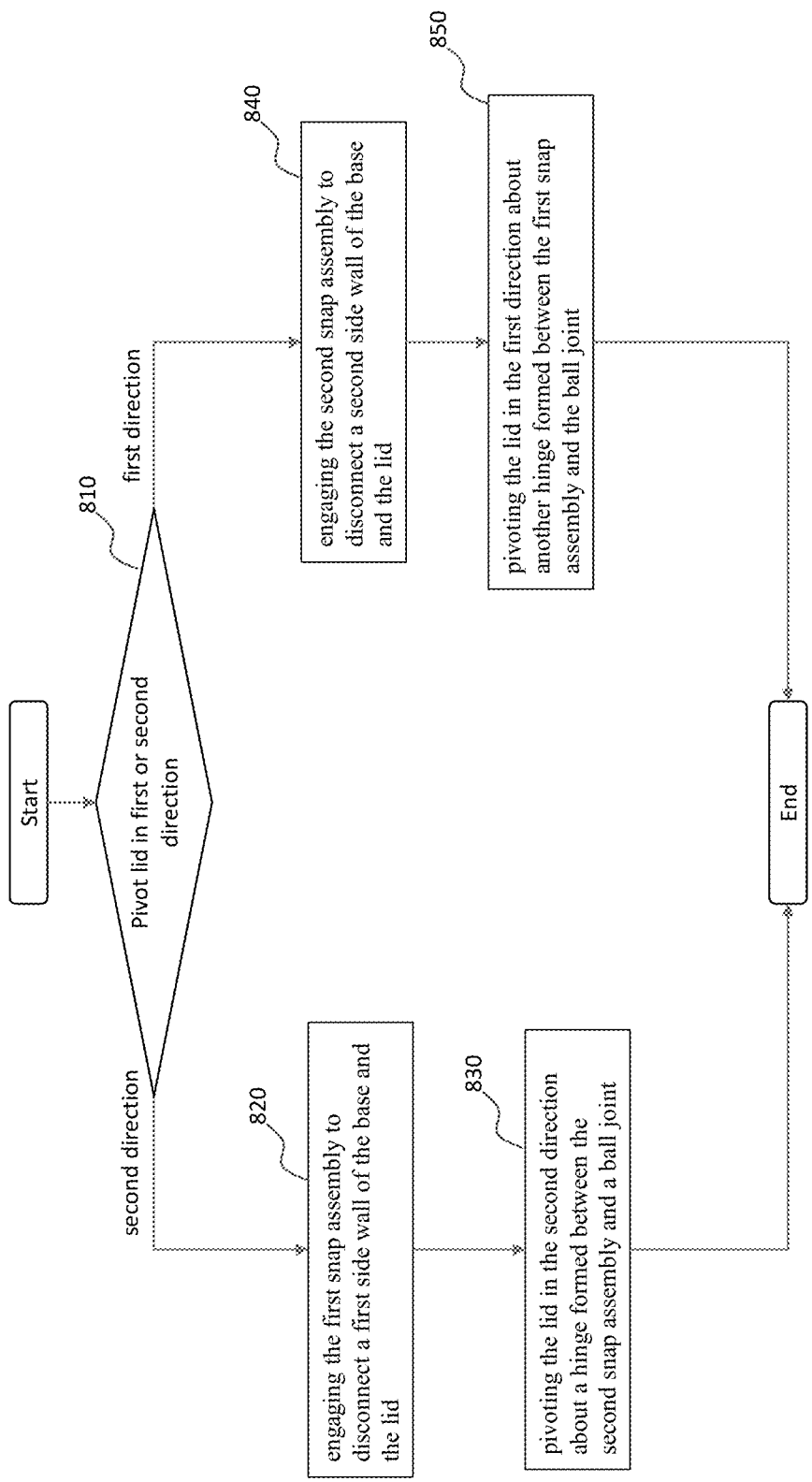
FIG. 12 shows a method of operating a while-in-use cover assembly.

Turning to FIG. 12, another flowchart shows a method of operating the while-in-use cover assembly 2. As shown in block 810 the method includes determining whether the lid 10 is being pivoted in the first direction D1 or the second direction D2. If the lid 10 is being pivoted in the second direction, then at block 820 the method includes engaging the first snap assembly 83a to disconnect the first side wall 98a of the base 70 and the lid 10. As shown in block 830 the method includes pivoting the lid 10 in the second direction D2 about a hinge (the second hinge) H2 formed between the second snap assembly 83b and the ball-joint 13. Alternatively, if the lid 10 is being pivoted in the first direction from block 810, then at block 840 the method includes engaging the second snap assembly 83b to disconnect the second side wall 98b of the base 70 and the lid 10. As shown in block 850 the method includes pivoting the lid 10 in the first direction D1 about another hinge (the first) H1 formed between the first snap assembly 83a and the ball joint 13. As indicated the first and second directions D1, D2 are perpendicular to one another.

Disclosed is a while-in-use cover assembly for an electric wire box, having: a base having a front surface and a bottom surface; a lid that selectively covers the base front surface, wherein a first geometric shape is formed by a top profile of the lid, and preferably, the while-in-use cover assembly is confined to the first geometric shape when closed; and a ball joint connecting the lid and the base, wherein the lid can pivot relative to the base, about the ball-joint, for positioning the lid against the base and away from the base, wherein: when the lid is positioned against the base the while-in-use cover assembly is closed; and when the lid is positioned away from the base, the while-in-use cover assembly is opened.

In addition to one or more of the above disclosed aspects, or as an alternate, the first geometric shape is a symmetric polygon.

In addition to one or more of the above disclosed aspects, or as an alternate, the first geometric shape is a rectangular.

In addition to one or more of the above disclosed aspects, or as an alternate, the lid and the base each include a first-corner, and the ball joint is disposed at the first-corner, so that the lid is pivoted relative to the base about the first-corner.

In addition to one or more of the above disclosed aspects, or as an alternate, the ball joint includes a ball connected to the lid and a ball-socket connected to the base, and the ball is disposed in the ball-socket and configured to swivel about the ball-socket when the lid is pivoted relative to the base.

In addition to one or more of the above disclosed aspects, or as an alternate, a plurality of guide tabs is formed on the ball and a plurality of guideways are formed in the ball-socket, and each of the plurality of guideways is configured to slidably receive two or more of the plurality of guide tabs, whereby the lid is configured to pivot in mutually perpendicular directions relative to the base.

In addition to one or more of the above disclosed aspects, or as an alternate, the ball includes a ball-platform that is connected to the lid; a stem is connected at one end to the ball-platform and at another end to the ball; the one end of the stem and the other end of the stem are spaced apart along a first axis; and a first guide tab of the plurality of guide tabs extends from the ball along the first axis.

In addition to one or more of the above disclosed aspects, or as an alternate, a second guide tab of the plurality of guide tabs extends from the ball along a second axis; a third guide tab of the plurality of guide tabs extends from the ball along a third axis, wherein the first axis; and the second axis and the third axis are perpendicular to one another.

In addition to one or more of the above disclosed aspects, or as an alternate, the plurality of guideways includes a first guideway and a second guideway; the first guideway is configured to receive the first guide tab and the third guide tab when the lid pivots in a first direction; and the second guideway is configured to receive the first guide tab and the second guide tab when the lid pivots in a second direction.

In addition to one or more of the above disclosed aspects, or as an alternate, the base includes a first side wall; and the while-in-use cover assembly includes a first snap assembly that pivotally connects the first side wall and the lid when the lid pivots in the first direction, whereby a first hinge is formed by the ball joint and the first snap assembly.

In addition to one or more of the above disclosed aspects, or as an alternate, the lid and the base each include a second-corner that is adjacent a first side of the ball-joint; and the first snap assembly is proximate the second-corner.

In addition to one or more of the above disclosed aspects, or as an alternate, the first snap assembly includes: a first boss fixed to the base; and a first resilient tab fixed to the lid, the first resilient tab defining a first tab-opening through which the first boss extends for connecting the base to the lid, wherein when the first resilient tab is biased outwardly, the first resilient tab is disengaged from the first boss, whereby the lid is configured for being pivoted relative to the base to open the while-in-use cover assembly.

In addition to one or more of the above disclosed aspects, or as an alternate, the base includes a second side wall; and the while-in-use cover assembly includes a second snap assembly that pivotally connects the second side wall and the lid when the lid pivots in the second direction, whereby a second hinge is formed by the ball joint and the second snap assembly.

In addition to one or more of the above disclosed aspects, or as an alternate, the lid and the base each include a third-corner that is adjacent a second side of the ball-joint; and the second snap assembly is proximate the third-corner.

In addition to one or more of the above disclosed aspects, or as an alternate, the second snap assembly includes: a second boss fixed to the base; and a second resilient tab fixed to the lid, the second resilient tab defining a second tab-opening through which the second boss extends for connecting the base to the lid, wherein when the second resilient tab is biased outwardly, the second resilient tab is disengaged from the second boss, whereby the lid is configured for being pivoted relative to the base to open the while-in-use cover assembly.

In addition to one or more of the above disclosed aspects, or as an alternate, one or more of the first boss and the second boss includes a bore configured to receive a fastener to secure the lid to the base when pivoting the lid relative to the base.

In addition to one or more of the above disclosed aspects, or as an alternate, the first side wall defines a first recess that receives a first insert, the first insert being removable; the first insert defines a first tongue perimeter-profile; the first recess defines a first groove perimeter-profile, whereby the first insert is configured to slide into the first recess for fixing the first insert and the first side wall to one another; and wherein a first exterior surface of the first insert includes a first eyelash surface contour.

In addition to one or more of the above disclosed aspects, or as an alternate, the second side wall defines a second recess that receives a second insert, the second insert being removable; the second insert defines a second tongue perimeter-profile; the second recess defines a second groove perimeter-profile, whereby the second insert is configured to slide into the second recess for fixing the second insert and the second side wall to one another; and wherein a second exterior surface of the second insert includes a second eyelash surface contour.

In addition to one or more of the above disclosed aspects, or as an alternate, the bottom surface of the base defines a receptacle-opening; the while-in-use cover assembly has an adaptor plate configured for being positioned against the receptacle-opening; and the adaptor plate defines one or more plate-openings.

Further disclosed is an assembly having: an electric wire box having a current device secured therein, the current device being positioned at a box front-surface of the electric wire box, the current device being a receptacle or switch; and a while-in-use cover assembly having one or more of the above disclosed aspects, wherein the bottom surface of the while-in-use cover assembly is positioned against the box front-surface, and wherein the bottom surface of the base defines a receptacle-opening; the while-in-use cover assembly includes an adaptor plate configured for being positioned against the receptacle-opening; and the adaptor plate defines one or more plate-openings for accessing the current device.

Further disclosed is a method of operating a while-in-use cover assembly, having: engaging a first snap assembly to disconnect a first side wall of a base and a lid, and pivoting the lid in a direction about a hinge formed between a second snap assembly and a ball joint; or engaging the second snap assembly to disconnect a second side wall of the base and the lid, and pivoting the lid in another direction about another hinge formed between the first snap assembly and the ball joint, wherein the direction and the other direction are perpendicular to one another, and wherein: a first geometric shape is formed by a top profile of the lid, and the while-in-use cover assembly is confined to the first geometric shape when closed.

The terms "first," "second," and so forth, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments.

The conduit connector of the instant application enables a significant advance in the state of the art. The detailed description set forth above in connection with the drawings is intended merely as a description of embodiments of the application, and is not intended to represent the only form in which the present application can be constructed or utilized. The description sets forth the designs, functions, means, and methods of implementing the application in connection with the illustrated embodiments. It is to be understood, however, that the same or equivalent functions and features can be accomplished by different embodiments that are also intended to be encompassed within the spirit and scope of the application.

We claim:

1. A while-in-use cover assembly for an electric wire box, comprising:
    a base having a front surface and a bottom surface;
    a lid that selectively covers the base front surface, wherein a first geometric shape is formed by a top profile of the lid, the first geometric shape is symmetric, and the while-in-use cover assembly is confined to the first geometric shape when closed; and
    a ball-joint connecting the lid and the base, wherein the lid can pivot along multiple axes relative to the base, about the ball-joint, for positioning the lid against the base and away from the base,
    wherein:
        when the lid is positioned against the base the while-in-use cover assembly is closed; and
        when the lid is positioned away from the base, the while-in-use cover assembly is opened.

2. The while-in-use cover assembly of claim 1, wherein the first geometric shape is a polygon.

3. The while-in-use cover assembly of claim 2, wherein the first geometric shape is a rectangular.

4. The while-in-use cover assembly of claim 3, wherein the lid and the base each include a first-corner, and the ball-joint is disposed at the first-corner, so that the lid is pivoted relative to the base about the first-corner.

5. The while-in-use cover assembly of claim 4, wherein the ball-joint includes a ball connected to the lid and a ball-socket connected to the base, and the ball is disposed in the ball-socket and configured to swivel about the ball-socket when the lid is pivoted relative to the base.

6. The while-in-use cover assembly of claim 5, wherein:
    a plurality of guide tabs is formed on the ball and a plurality of guideways are formed in the ball-socket, and
    each of the plurality of guideways is configured to slidably receive two or more of the plurality of guide tabs, whereby the lid is configured to pivot in mutually perpendicular directions relative to the base.

7. The while-in-use cover assembly of claim 6, wherein:
    the ball includes a ball-platform that is connected to the lid;
    a stem is connected at one end to the ball-platform and at another end to the ball;
    the one end of the stem and the other end of the stem are spaced apart along a first axis; and
    a first guide tab of the plurality of guide tabs extends from the ball along the first axis.

8. The while-in-use cover assembly of claim 7, wherein:
    a second guide tab of the plurality of guide tabs extends from the ball along a second axis;
    a third guide tab of the plurality of guide tabs extends from the ball along a third axis, wherein the first axis, the second axis and the third axis are perpendicular to one another.

9. The while-in-use cover assembly of claim 8, wherein:
    the plurality of guideways includes a first guideway and a second guideway;
    the first guideway is configured to receive the first guide tab and the third guide tab when the lid pivots in a first direction; and
    the second guideway is configured to receive the first guide tab and the second guide tab when the lid pivots in a second direction.

10. The while-in-use cover assembly of claim 9, wherein:
    the base includes a first side wall; and
    the while-in-use cover assembly includes a first snap assembly that pivotally connects the first side wall and the lid when the lid pivots in the first direction,
    whereby a first hinge is formed by the ball-joint and the first snap assembly.

11. The while-in-use cover assembly of claim 10, wherein:
    the lid and the base each include a second-corner that is adjacent a first side of the ball-joint; and
    the first snap assembly is proximate the second-corner.

12. The while-in-use cover assembly of claim 11, wherein the first snap assembly includes:
    a first boss fixed to the base; and
    a first resilient tab fixed to the lid,
    the first resilient tab defining a first tab-opening through which the first boss extends for connecting the base to the lid,
    wherein when the first resilient tab is biased outwardly, the first resilient tab is disengaged from the first boss, whereby the lid is configured for being pivoted relative to the base to open the while-in-use cover assembly.

13. The while-in-use cover assembly of claim 12, wherein:
    the base includes a second side wall; and
    the while-in-use cover assembly includes a second snap assembly that pivotally connects the second side wall and the lid when the lid pivots in the second direction,
    whereby a second hinge is formed by the ball-joint and the second snap assembly.

14. The while-in-use cover assembly of claim 13, wherein:
    the lid and the base each include a third-corner that is adjacent a second side of the ball-joint; and
    the second snap assembly is proximate the third-corner.

15. The while-in-use cover assembly of claim 14, wherein the second snap assembly includes:
    a second boss fixed to the base; and
    a second resilient tab fixed to the lid, the second resilient tab defining a second tab-opening through which the second boss extends for connecting the base to the lid,
    wherein when the second resilient tab is biased outwardly, the second resilient tab is disengaged from the second boss,
    whereby the lid is configured for being pivoted relative to the base to open the while-in-use cover assembly.

16. The while-in-use cover assembly of claim 14, wherein one or more of the first boss and the second boss includes a bore configured to receive a fastener to secure the lid to the base when pivoting the lid relative to the base.

17. The while-in-use cover assembly of claim 13, wherein:
    the first side wall defines a first recess that receives a first insert, the first insert being removable;
    the first insert defines a first tongue perimeter-profile;
    the first recess defines a first groove perimeter-profile,
    whereby the first insert is configured to slide into the first recess for fixing the first insert and the first side wall to one another; and
    wherein a first exterior surface of the first insert includes a first eyelash surface contour.

18. The while-in-use cover assembly of claim 17, wherein:
    the second side wall defines a second recess that receives a second insert, the second insert being removable;

the second insert defines a second tongue perimeter-profile;

the second recess defines a second groove perimeter-profile, whereby the second insert is configured to slide into the second recess for fixing the second insert and the second side wall to one another; and wherein a second exterior surface of the second insert includes a second eyelash surface contour.

19. An assembly comprising:

an electric wire box having a current device secured therein, the current device being positioned at a box front-surface of the electric wire box, the current device being a receptacle or switch; and the while-in-use cover assembly of claim 1, wherein the bottom surface of the while-in-use cover assembly is positioned against the box front-surface; and wherein the bottom surface of the base defines a receptacle-opening;

the while-in-use cover assembly comprises an adaptor plate configured for being positioned against the receptacle-opening; and the adaptor plate defines one or more plate-openings for accessing the current device.

20. A method of operating a while-in-use cover assembly, comprising:

engaging a first snap assembly to disconnect a first side wall of a base and a lid that, via a ball-joint connecting the lid and the base, can pivot along multiple axes, and pivoting the lid in a direction about a hinge formed between a second snap assembly and the ball-joint; or engaging the second snap assembly to disconnect a second side wall of the base and the lid, and pivoting the lid in another direction about another hinge formed between the first snap assembly and the ball: joint, wherein the direction and the other direction are perpendicular to one another, and wherein a first geometric shape is formed by a top profile of the lid, the first geometric shape is symmetric, and the while-in-use cover assembly is confined to the first geometric shape when closed.

* * * * *